United States Patent
Zhang et al.

(10) Patent No.: US 10,122,410 B2
(45) Date of Patent: Nov. 6, 2018

(54) CHANNEL TRANSMISSION CHARACTERISTIC OBTAINING METHOD AND APPARATUS

(71) Applicant: Huawei Technologies Co., Ltd., Shenzhen (CN)

(72) Inventors: Xiaolong Zhang, Wuhan (CN); Jie Lv, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/471,955

(22) Filed: Mar. 28, 2017

(65) Prior Publication Data

US 2017/0201293 A1  Jul. 13, 2017

Related U.S. Application Data

(63) Continuation of application No. PCT/CN2014/087701, filed on Sep. 28, 2014.

(51) Int. Cl.
  *H04L 5/16* (2006.01)
  *H04B 3/48* (2015.01)
  *H04B 3/06* (2006.01)
  *H04H 20/12* (2008.01)
  *H04L 25/02* (2006.01)
  (Continued)

(52) U.S. Cl.
  CPC .............. *H04B 3/48* (2013.01); *H04B 3/06* (2013.01); *H04H 20/12* (2013.01); *H04L 25/022* (2013.01); *H04N 21/6118* (2013.01); *H04N 21/6168* (2013.01); *H04N 7/17309* (2013.01)

(58) Field of Classification Search
  CPC .............................. H04L 5/1423; H04L 5/16
  See application file for complete search history.

(56) References Cited

U.S. PATENT DOCUMENTS

2010/0118930 A1  5/2010  Suwada
2012/0243597 A1  9/2012  Currivan et al.

FOREIGN PATENT DOCUMENTS

CN  101056219 A  10/2007
CN  101755389 A  6/2010
(Continued)

OTHER PUBLICATIONS

Machine Translation and Abstract of Chinese Publication No. CN101056219, Oct. 17, 2007, 18 pages.

(Continued)

*Primary Examiner* — Hassan A Phillips
*Assistant Examiner* — Prenell P Jones
(74) *Attorney, Agent, or Firm* — Conley Rose, P.C.

(57) ABSTRACT

A channel transmission characteristic obtaining method and apparatus, where the method includes obtaining transmission characteristic curves of at least two channels in a cable modem in a channel scanning manner, where the at least two channels form one contiguous frequency band, and frequencies corresponding to the transmission characteristic curves of the at least two channels include frequency values on a same order of magnitude, and amplitude values on a same order of magnitude, translating the transmission characteristic curves of the channels in an amplitude direction, to make amplitudes corresponding to same frequencies on all transmission characteristic curves overlapped in order to form one continuous curve, and setting the continuous curve as a transmission characteristic curve of the contiguous frequency band.

20 Claims, 5 Drawing Sheets

(51) Int. Cl.
*H04N 21/61* (2011.01)
*H04N 7/173* (2011.01)

(56) References Cited

FOREIGN PATENT DOCUMENTS

| CN | 103001666 A | 3/2013 |
|---|---|---|
| CN | 104007705 | 8/2014 |
| EP | 2717486 A1 | 4/2014 |

OTHER PUBLICATIONS

Machine Translation and Abstract of Chinese Publication No. CN103001666, Mar. 27, 2013, 12 pages.
Machine Translation and Abstract of Chinese Publication No. CN104007705, Aug. 27, 2014, 27 pages.
"CM-SP-PHYv3.0-I11-130808," Physical Layer Specification, Docsis 3.0, Aug. 8, 2013, 200 pages.
"CM-SP-PHYv3.1-I02-140320," Physical Layer Specification, Docsis 3.1, Mar. 20, 2014, 236 pages.
Foreign Communication From a Counterpart Application, PCT Application No. PCT/CN2014/087701, English Translations of International Search Report dated Jul. 2, 2015, 2 pages.
Foreign Communication From a Counterpart Application, PCT Application No. PCT/CN2014/087701, English Translations of Written Opinion dated Jul. 2, 2015, 5 pages.
Foreign Communication From a Counterpart Application, European Application No. 14902686.6, Extended European Search Report dated Aug. 23, 2017, 8 pages.

CHANNEL TRANSMISSION CHARACTERISTIC OBTAINING METHOD AND APPARATUS

CROSS-REFERENCE TO RELATED APPLICATIONS

This application is a continuation of International Patent Application No. PCT/CN2014/087701 filed on Sep. 28, 2014, which is hereby incorporated by reference in its entirety.

TECHNICAL FIELD

The present disclosure relates to the communications technologies, and in particular, to a channel transmission characteristic obtaining method and apparatus.

BACKGROUND

A hybrid fiber-coaxial (HFC) network technology is an economical and practical integrated digital service broadband network access technology. An HFC generally includes three parts, an optical fiber trunk, a coaxial cable branch, and a user cable distribution network. A program signal from a cable television station is first converted into an optical signal for transmission on the trunk. The optical signal is converted into an electrical signal in a user area, and sent to a user using a coaxial cable after being distributed by a distributor.

FIG. 1 is a schematic diagram of a typical HFC network. As shown in FIG. 1, the HFC network includes the devices and components, such as a network management system, a proactive network maintenance (PNM) server, a cable modem termination system (CMTS), an optical station, a cable modem (CM), a user-side set top box (STB), a personal computer (PC), and components such as a fiber, a coaxial cable, an amplifier, and an attenuator (the components are not shown one by one in the figure). It can be seen that the CMTS is located on a metropolitan area network side and is also referred to as a head end, and the CM is located on a user end.

A transmission characteristic refers to a relationship between an input signal and an output signal when a signal passes through a device or a channel, and is a parameter that reflects transmission quality and performance of the device or the channel. For the HFC network, the transmission characteristic mainly refers to a relationship curve between an attenuation characteristic and a frequency when a signal passes through the network. This relationship is also referred to as an amplitude-frequency characteristic (amplitude and frequency curve) of the signal. The devices, components, and cables in the HFC network have respective transmission characteristics, and a network structure is complex, resulting in different transmission characteristics from users CM to a head end CMTS.

A transmission characteristic from the CM to the head end is widely used in designing and debugging of the HFC network, and in future operation and maintenance. Proper components and an optimal cascading manner need to be selected for installation and layout when the HFC network is designed and debugged for the first time, to ensure similar path losses of all users. An optical device and an amplifier further need to be debugged after the installation, to finally maintain consistency of transmission characteristics of all the users. In an operation and maintenance aspect, as network usage time goes by, characteristics of all components have different levels of changes and distortion (because of aging, water corrosion, cable bent, and the like), finally resulting in distortion of transmission characteristic curves of all the users. For example, fluctuation or unflatness appears, and some users even encounter relatively severe faults. In this case, locations of the faults need to be analyzed by analyzing the transmission characteristic of the network, to perform line adjustment.

To obtain the transmission characteristic from the CM to the head end, a network signal is usually measured and analyzed using a network analyzer or a spectrum analyzer. However, this manner can only be performed when the entire HFC network is in a power-off state, and cannot be performed when the HFC is in a working state. In addition, this method requires that there is no intrusion signal in the network, such as noise interference. An intrusion signal is measured by an instrument if there is the intrusion signal. Consequently, a line characteristic cannot be correctly reflected, resulting in inaccurate measurement and analysis.

SUMMARY

Embodiments of the present disclosure provide a channel transmission characteristic obtaining method and apparatus, to obtain a channel transmission characteristic when an HFC network is in a working state, and improve accuracy of an analysis result.

According to a first aspect, an embodiment of the present disclosure provides a channel transmission characteristic obtaining method, including obtaining transmission characteristic curves of at least two channels in a CM in a channel scanning manner, where one characteristic curve reflects amplitudes of one channel at all frequencies, the at least two channels form one contiguous frequency band, and frequencies corresponding to the transmission characteristic curves of the at least two channels have frequency values on a same order of magnitude, and have amplitude values on a same order of magnitude, translating the transmission characteristic curves of the channels in an amplitude direction, to make amplitudes corresponding to same frequencies on all transmission characteristic curves overlapped in order to form one continuous curve, and setting the continuous curve as a transmission characteristic curve of the contiguous frequency band.

In a first possible implementation manner of the first aspect, translating the transmission characteristic curves of the channels in an amplitude direction, to make amplitudes corresponding to same frequencies on all transmission characteristic curves overlapped in order to form one continuous curve includes calculating a difference between amplitudes corresponding to a same frequency on transmission characteristic curves of any two adjacent channels, and setting the difference as a first distance MovedV, fixing a transmission characteristic curve of one channel in the any two adjacent channels, and translating a transmission characteristic curve of the other channel in an amplitude direction by the first distance MovedV, to make the amplitudes corresponding to the same frequency on the transmission characteristic curves of the two adjacent channels overlapped in order to form a transmission characteristic curve corresponding to a frequency band including the two adjacent channels, and continuing to execute the foregoing steps for the transmission characteristic curve corresponding to the frequency band including the adjacent channels, until transmission characteristic curves corresponding to all channels form one continuous curve.

According to the first possible implementation manner of the first aspect, in a second possible implementation manner, fixing a transmission characteristic curve of one channel in the any two adjacent channels includes fixing a transmission characteristic curve of a channel that has a smaller frequency in the any two adjacent channels.

According to the first or the second possible implementation manner of the first aspect, in a third possible implementation manner, if there are multiple same frequencies on the transmission characteristic curves of the two adjacent channels, calculating a difference between amplitudes corresponding to a same frequency on transmission characteristic curves of any two adjacent channels, and setting the difference as a first distance MovedV includes calculating differences between amplitudes corresponding to all the same frequencies on the transmission characteristic curves of the adjacent channels, and calculating an average value of the differences between the amplitudes corresponding to all the same frequencies, and setting the average value as the first distance MovedV.

According to any one of the first aspect, or the first to the third possible implementation manners of the first aspect, in a fourth possible implementation manner, obtaining transmission characteristic curves of at least two channels in a CM includes collecting pre-equalization coefficients of the at least two channels in the CM, and obtaining the transmission characteristic curves of the channels according to the pre-equalization coefficients of the at least two channels.

According to any one of the first aspect, or the first to the fourth possible implementation manners of the first aspect, in a fifth possible implementation manner, the method further includes collecting transmit power of the CM and receive power of a CMTS corresponding to each of the channels, obtaining line attenuation power according to the transmit power and the receive power corresponding to each of the channels, and shifting upward the transmission characteristic curve of the frequency band in an amplitude direction by a value of the line attenuation power, to obtain an absolute value of a transmission characteristic of the frequency band.

According to a second aspect, an embodiment of the present disclosure provides a channel transmission characteristic obtaining apparatus, including an obtaining module configured to obtain transmission characteristic curves of at least two channels in a CM in a channel scanning manner, where one characteristic curve reflects amplitudes of one channel at all frequencies, the at least two channels form one contiguous frequency band, and frequencies corresponding to the transmission characteristic curves of the at least two channels have frequency values on a same order of magnitude, and have amplitude values on a same order of magnitude, and a processing module configured to translate the transmission characteristic curves of the channels in an amplitude direction, to make amplitudes corresponding to same frequencies on all transmission characteristic curves overlapped in order to form one continuous curve, and set the continuous curve as a transmission characteristic curve of the contiguous frequency band.

In a first possible implementation manner of the second aspect, the processing module is further configured to calculate a difference between amplitudes corresponding to a same frequency on transmission characteristic curves of any two adjacent channels, and set the difference as a first distance MovedV, fix a transmission characteristic curve of one channel in the any two adjacent channels, and translate a transmission characteristic curve of the other channel in an amplitude direction by the first distance MovedV, to make the amplitudes corresponding to the same frequency on the transmission characteristic curves of the two adjacent channels overlapped in order to form a transmission characteristic curve corresponding to a frequency band including the two adjacent channels, and continue to execute the foregoing steps for the transmission characteristic curve corresponding to the frequency band including the adjacent channels, until transmission characteristic curves corresponding to all channels form one continuous curve.

According to the first possible implementation manner of the second aspect, in a second possible implementation manner, the processing module is further configured to fix a transmission characteristic curve of a channel that has a smaller frequency in the any two adjacent channels.

According to the first or the second possible implementation manner of the second aspect, in a third possible implementation manner, if there are multiple same frequencies on the transmission characteristic curves of the at least two adjacent channels, the processing module is further configured to calculate differences between amplitudes corresponding to all the same frequencies on the transmission characteristic curves of the adjacent channels, and calculate an average value of the differences between the amplitudes corresponding to all the same frequencies, and set the average value as the first distance MovedV.

According to any one of the second aspect, or the first to the third possible implementation manners of the second aspect, in a fourth possible implementation manner, the obtaining module is further configured to collect pre-equalization coefficients of the at least two channels in the CM, and obtain the transmission characteristic curves of the channels according to the pre-equalization coefficients of the at least two channels.

According to any one of the second aspect, or the first to the fourth possible implementation manners of the second aspect, in a fifth possible implementation manner, the obtaining module is further configured to collect transmit power of the CM and receive power of a CMTS that are corresponding to each of the channels, and the processing module is further configured to obtain line attenuation power according to the transmit power and the receive power corresponding to each of the channels, and shift upward the transmission characteristic curve of the frequency band in an amplitude direction by a value of the line attenuation power, to obtain an absolute value of a transmission characteristic of the frequency band.

According to a third aspect, an embodiment of the present disclosure provides a server, including an interface circuit configured to obtain transmission characteristic curves of at least two channels in a CM in a channel scanning manner, where one characteristic curve reflects amplitudes of one channel at all frequencies, the at least two channels form one contiguous frequency band, and frequencies corresponding to the transmission characteristic curves of the at least two channels have frequency values on a same order of magnitude, and have amplitude values on a same order of magnitude, and a processor configured to translate the transmission characteristic curves of the channels in an amplitude direction, to make amplitudes corresponding to same frequencies on all transmission characteristic curves overlapped in order to form one continuous curve, and set the continuous curve as a transmission characteristic curve of the contiguous frequency band.

In a first possible implementation manner of the third aspect, the processor is further configured to calculate a difference between amplitudes corresponding to a same frequencies on transmission characteristic curves of any two adjacent channels, and set the difference as a first distance MovedV, fix a transmission characteristic curve of one channel in the any two adjacent channels, and translate a transmission characteristic curve of the other channel in an amplitude direction by the first distance MovedV, to make the amplitudes corresponding to the same frequencies on the transmission characteristic curves of the two adjacent channels overlapped in order to form a transmission characteristic curve corresponding to a frequency band including the two adjacent channels, and continue to execute the foregoing steps for the transmission characteristic curve corresponding to the frequency band including the adjacent channels, until transmission characteristic curves corresponding to all channels form one continuous curve.

According to the first possible implementation manner of the third aspect, in a second possible implementation manner, the processor is further configured to fix a transmission characteristic curve of a channel that has a smaller frequency in the any two adjacent channels.

According to the first or the second possible implementation manner of the third aspect, in a third possible implementation manner, if there are multiple same frequencies on the transmission characteristic curves of the at least two adjacent channels, the processor is further configured to calculate differences between amplitudes corresponding to all the same frequencies on the transmission characteristic curves of the adjacent channels, and calculate an average value of the differences between the amplitudes corresponding to all the same frequencies, and set the average value as the first distance MovedV.

According to any one of the third aspect, or the first to the third possible implementation manners of the third aspect, in a fourth possible implementation manner, the interface circuit is further configured to collect pre-equalization coefficients of the at least two channels in the CM, and obtain the transmission characteristic curves of the channels according to the pre-equalization coefficients of the at least two channels.

According to any one of the third aspect, or the first to the fourth possible implementation manners of the third aspect, in a fifth possible implementation manner, the interface circuit is further configured to collect transmit power of the CM and receive power of a CMTS corresponding to each of the channels, and the processor is further configured to obtain line attenuation power according to the transmit power and the receive power corresponding to each of the channels, and shift upward the transmission characteristic curve of the frequency band in an amplitude direction by a value of the line attenuation power, to obtain an absolute value of a transmission characteristic of the frequency band.

According to the channel transmission characteristic obtaining method and apparatus provided in the embodiments of the present disclosure, a pre-equalization coefficient of each frequency band is collected according to a channel scanning method, and a transmission characteristic of each frequency band is obtained according to the pre-equalization coefficient. Then, translation processing is performed on a transmission characteristic curve of each frequency band, to obtain a transmission characteristic curve of an entire frequency band. The channel scanning method can be performed when an HFC network is in a working state, and the network does not need to be powered off. In addition, the collected pre-equalization coefficient is unrelated to network noise, and can reflect a line transmission characteristic. Therefore, compared with the other approaches for measurement using an instrument, accuracy of an analysis result can be improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
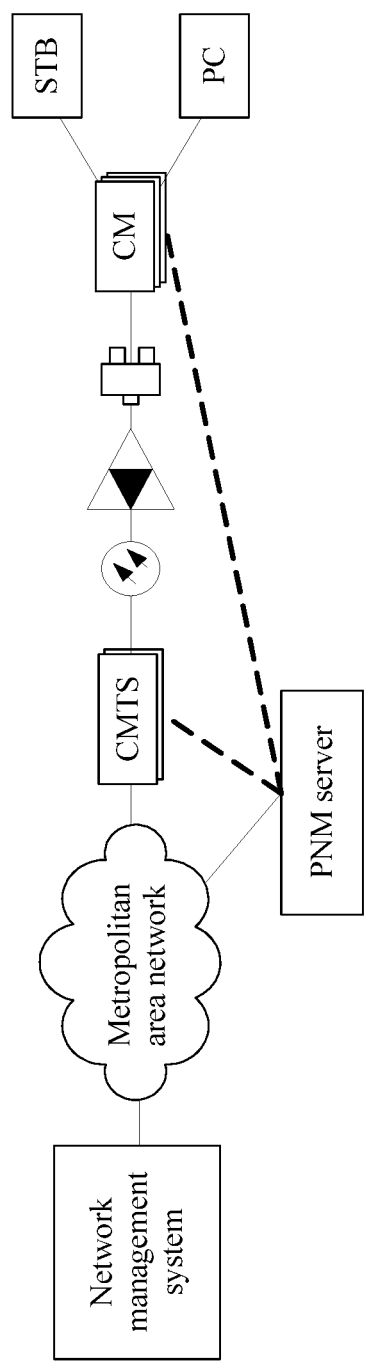
FIG. 1 is a schematic diagram of a typical HFC network.
Figure 2:
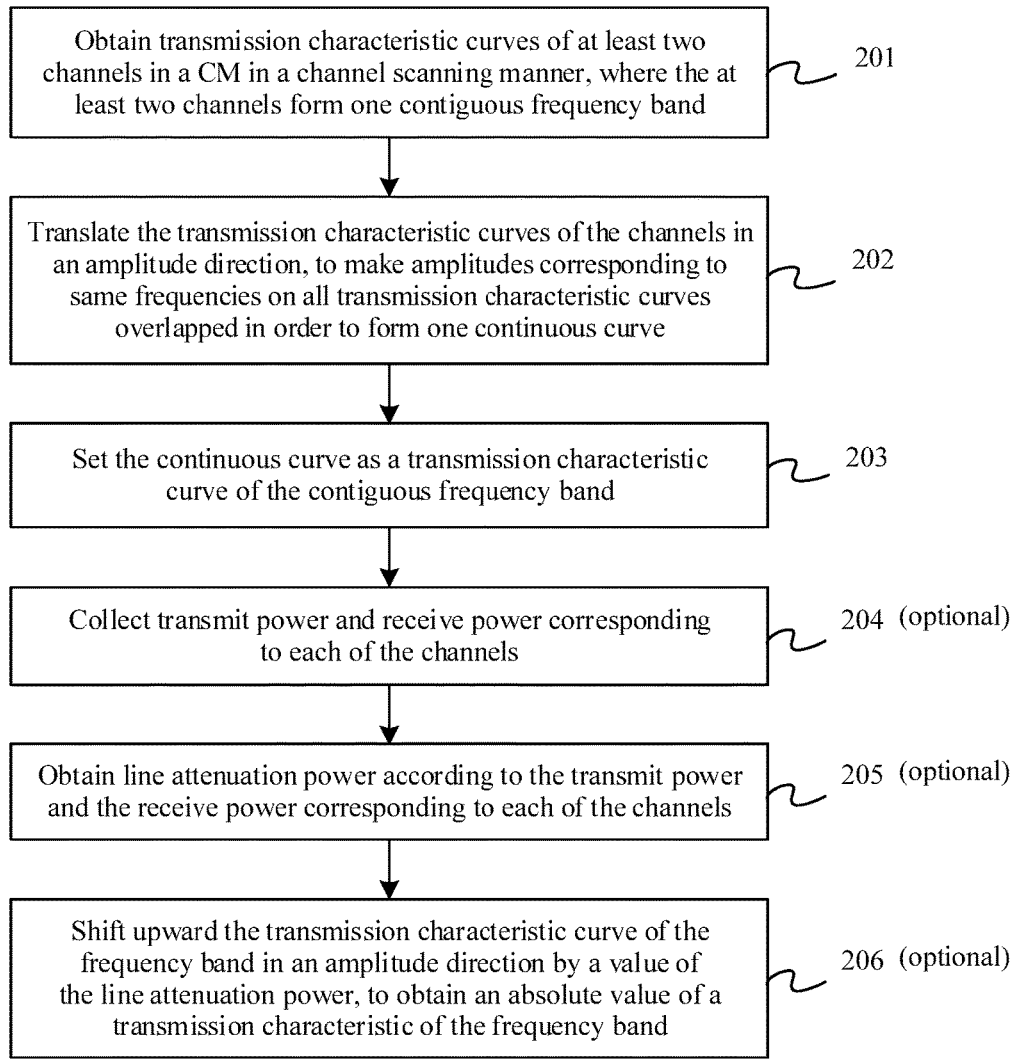
FIG. 2 is a flowchart of a channel transmission characteristic obtaining method according to an embodiment of the present disclosure.

FIG. 2 is a flowchart of a channel transmission characteristic obtaining method according to an embodiment of the present disclosure. As shown in FIG. 2, the method in this embodiment may be completed by a server disposed on a network side or a channel transmission characteristic obtaining apparatus at another location of an HFC network. The method in this embodiment may include the following steps.

Step 201: Obtain respective transmission characteristic curves of at least two channels in a CM in a channel scanning manner, where the at least two channels form one contiguous frequency band.

One characteristic curve reflects amplitudes of one channel at all frequencies. Frequencies corresponding to the transmission characteristic curves of the at least two channels have frequency values on a same order of magnitude, and have amplitude values on a same order of magnitude. That is, the transmission characteristic curves of the at least two channels obtained in step 201 may be located in a same coordinate system. In this way, in the coordinate system, frequency units indicated by horizontal coordinates of all transmission characteristic curves are the same, and amplitude units indicated by vertical coordinates of all the transmission characteristic curves are also the same.

Figure 3:
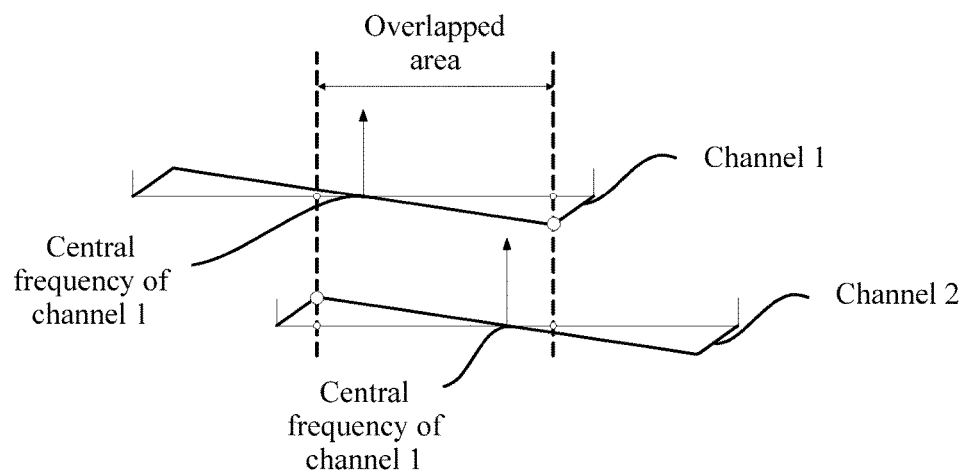
FIG. 3 is a schematic diagram of an overlapped area of two adjacent channels.

A frequency located at the most central location on a channel may be referred to as a central frequency of the channel. Central frequencies of channels in the CM may be set according to a specific rule. For example, the frequencies may be set in an equal-difference increasing or decreasing manner, to ensure that an entire to-be-measured frequency band is covered. In addition, to make a finally obtained transmission characteristic curve of the entire frequency band continuous, for any two adjacent channels, a last frequency of a previous channel and a first frequency of a following channel need to be overlapped. To improve accuracy of a result, the two channels may further overlap at a specific length. As shown in FIG. 3, FIG. 3 is a schematic diagram of an overlapped area of two adjacent channels.

In specific implementation, for an uplink frequency band whose frequency range is 5 to 42 megahertz (MHz), to improve efficiency, a bandwidth of each channel may be set to maximum, that is, 6.4 MHz, and central frequencies of all channels may be respectively 8.2 MHz, 11.4 MHz, 14.6 MHz, . . . , 33.8 MHz, and 37 MHz.

It should be noted that the foregoing channels may be set by controlling a CMTS in a network management device. The network management device determines a quantity of uplink channels, and a central frequency of each of the uplink channels. In actual network operation, the CM and the CMTS transmit information according to these settings. In addition, general channel settings can meet a channel requirement in this embodiment of the present disclosure. Therefore, in specific implementation, an existing channel and frequency can be directly used.

After the channels and the frequencies are determined, transmission characteristic curves of the foregoing set channels may be collected.

Figure 4:
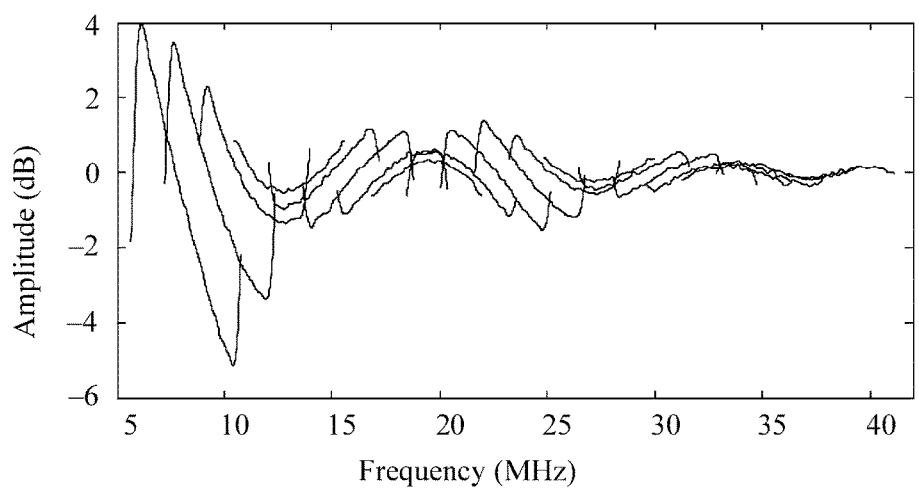
FIG. 4 is a schematic diagram of transmission characteristic curves of multiple channels in a CM.

Further, if an in-band frequency response of a channel, that is, a transmission characteristic curve of each channel, can be directly collected in the network, the transmission characteristic curve of each channel can be directly collected in step 201. If the in-band frequency response of the channel cannot be directly collected in the network, step 201 may include collecting pre-equalization coefficients of the at least two channels in the CM in the channel scanning manner, and obtaining the transmission characteristic curves of the channels according to the pre-equalization coefficients of the at least two channels. Further, Fourier Transform may be performed on the collected pre-equalization coefficients to obtain corresponding in-band frequency responses, that is, the transmission characteristic curves. FIG. 4 is a schematic diagram of transmission characteristic curves of multiple channels in a CM. The transmission characteristic curves, of the multiple channels, obtained according to pre-equalization coefficients or directly collected are shown in FIG. 4.

Step 202: Translate the transmission characteristic curves of the channels in an amplitude direction, to make amplitudes corresponding to same frequencies on all transmission characteristic curves overlapped in order to form one continuous curve.

In a special case, two adjacent channels are connected head-to-tail, that is, the two adjacent channels have only one overlapped frequency. Step 202 may include the following substeps.

Calculate a difference between amplitudes corresponding to a same frequency on transmission characteristic curves of any two channels, set the difference as a first distance MovedV, fix a transmission characteristic curve of one of the channels, and translate a transmission characteristic curve of the other channel in an amplitude direction by the first distance MovedV, to make the amplitudes corresponding to the same frequency on the transmission characteristic curves of the two channels overlapped.

In a more common case, an overlapped frequency band between adjacent channels is a relatively long frequency band, that is, there are multiple same frequencies on the transmission characteristic curves of the at least two channels. Calculating a difference between amplitudes corresponding to a same frequency on transmission characteristic curves of any two channels, and setting the difference as a first distance MovedV includes the following substeps.

Calculate differences between amplitudes corresponding to all same frequencies on the transmission characteristic curves of the any two channels, and then calculate an average value of the differences between the amplitudes corresponding to all the same frequencies, and set the average value as the first distance MovedV.

For step 202, an optional translation manner is as follows. Translate transmission characteristic curves of two adjacent channels in order, until all curves form one continuous curve. Further, step 202 may include the following substeps.

Calculate a difference between amplitudes corresponding to a same frequency on transmission characteristic curves of any two adjacent channels, and set the difference as a first distance MovedV.

Fix a transmission characteristic curve of one channel in the any two adjacent channels, and translate a transmission characteristic curve of the other channel in an amplitude direction by the first distance MovedV, to make the amplitudes corresponding to the same frequency on the transmission characteristic curves of the two adjacent channels overlapped in order to form a transmission characteristic curve corresponding to a frequency band including the two adjacent channels.

Continue to execute the foregoing steps for the transmission characteristic curve corresponding to the frequency band including the adjacent channels, until transmission characteristic curves corresponding to all channels form one continuous curve.

In specific implementation, fixing a transmission characteristic curve of one channel in the any two adjacent channels may include fixing a transmission characteristic curve of a channel that has a smaller frequency in the any two adjacent channels. The channel that has a smaller frequency is as follows. If a minimum frequency value of a frequency corresponding to a transmission characteristic curve is smaller than a minimum frequency value on another transmission characteristic curve, a channel corresponding to the transmission characteristic curve that has the frequency whose frequency value is smaller is the channel that has a smaller frequency.

For example, there are three channels, respectively referred to as a first channel, a second channel, and a third channel. The first channel and the second channel are adjacent channels. The second channel and the third channel are adjacent channels. A first distance between the first channel and the second channel may be calculated and marked as $MovedV_2$, and a first distance between the second channel and the third channel may be calculated and marked as $MovedV_3$. A transmission characteristic curve of the second channel may be first fixed, and a transmission characteristic curve of the third channel is translated in an amplitude direction by $MovedV_3$, to make amplitudes corresponding to a same frequency on the transmission characteristic curves of the third channel and the second channel overlapped. In this case, a transmission characteristic curve corresponding to a frequency band including the second channel and the third channel is formed. Then, a transmission characteristic curve of the first channel is fixed, and the transmission characteristic curve corresponding to the frequency band including the second channel and the third channel is translated in an amplitude direction by MovedV$_2$, to make amplitudes corresponding to a same frequency on the transmission characteristic curves of the second channel and the first channel overlapped. In this case, a transmission characteristic curve corresponding to a frequency band including the first channel, the second channel, and the third channel is formed.

Optionally, distances (that is, second distances) by which the transmission characteristic curves of all the channels need to be translated are separately calculated, and then the curves are translated by their respective second distances, to obtain a transmission characteristic curve of a to-be-measured contiguous frequency band. Specific operations may be as follows.

If there are N channels, N is an integer greater than 1, a channel whose central frequency has a minimum frequency value is a first channel, and other channels are sorted in ascending order of central frequencies, where the central frequency refers to a frequency located at the most central location on a channel, step 202 may include the following substeps.

Calculate a difference between amplitudes corresponding to a same frequency on transmission characteristic curves of any two adjacent channels, and set the difference as a first distance MovedV, where a first distance corresponding to a transmission characteristic curve of a j$^{th}$ channel is MovedV$_j$, and j is an integer greater than 1 and less than or equal to N.

Calculate a second distance corresponding to a transmission characteristic curve of an i$^{th}$ channel according to the following formula:

$$MovedPower_i = \sum_{j=2}^{i} MovedV_j,$$

where MovedPower$_i$ is the second distance corresponding to the transmission characteristic curve of the i$^{th}$ channel, and i is an integer greater than 1 and less than or equal to N.

Fix a transmission characteristic curve of the first channel, and separately translate transmission characteristic curves of the other channels in an amplitude direction by second distances corresponding to the transmission characteristic curves of the channels, to make amplitudes corresponding to same frequencies on the transmission characteristic curves of all the channels overlapped in order to form one continuous curve.

Transmission characteristic curves of multiple channels in a CM shown in FIG. 4 are used as an example in the following to describe this manner in step 202 in detail.

In step 202, all transmission characteristic curves need to be translated in an amplitude direction using respective central frequencies as axes. A translation objective is to make curves corresponding to overlapped frequency bands overlapped, to obtain one continuous curve.

In a translation process, in transmission characteristic curves of two adjacent channels, a quantity by which a following curve needs to be translated relative to a previous curve is referred to as a first distance, that is, MovedV. A method for calculating the first distance MovedV may be as follows. Perform a subtraction operation between values of amplitudes corresponding to an overlapped part of frequencies on these two curves, and then calculate an average value. A specific translation process may be controlled by a program, and specific steps may be as follows.

It is assumed that a channel that has a minimum central frequency is a first channel, and other channels are sorted in ascending order of central frequencies. Frequencies in an overlapped area of a (k−1)$^{th}$ curve and a k$^{th}$ curve are f=[f$_{k,1}$, f$_{k,2}$, . . . , f$_{k,m}$], m frequencies in total. Amplitude values corresponding to these frequencies on the (k−1)$^{th}$ curve are V$_{k-1}$=[V$_{k-1,1}$, V$_{k-1,2}$, . . . , V$_{k-1,m}$], and amplitude values corresponding to these frequencies on the k$^{th}$ curve are V$_k$=[V$_{k,1}$, V$_{k,2}$, . . . , V$_{k,m}$]. Curve overlapping needs to be performed in the overlapped area, and a first distance MovedV$_k$ by which the k$^{th}$ curve needs to be translated relative to the (k−1)$^{th}$ curve is:

$$MovedV_k = \sum_{i=1}^{m} (V_{k-1,i} - V_{k,i})/m \quad (1)$$

According to formula (1), a first distance of a second curve relative to a first curve may be calculated as MovedV$_2$, a first distance of a third curve relative to the second curve is MovedV$_3$. By analogy, a set c of first distances MovedV of all two adjacent curves may be calculated as follows:

$$c = [MovedV_2, MovedV_3, \ldots, MovedV_N] \quad (2)$$

where N is a quantity of channels.

Then, the first curve is used as a reference, that is, the first curve is not translated. First distances MovedV of other curves are gradually accumulated, that is, a relative translation quantity of each curve is a sum of a first distance of the curve and first distances of all curves previous to the curve. A final relative translation quantity of each curve, that is, a second distance MovedPower, is calculated to combine all the curves, and obtain a transmission characteristic curve of an entire frequency band. The second distance MovedPower of each curve is as follows:

If a second distance MovedPower of an i$^{th}$ curve is MovedPower$_i$, a calculation method of MovedPower$_i$ is the following formula (3):

$$MovedPower_i = MovedV_2 + MovedV_3 + \ldots + MovedV_i \quad (3)$$

A set of the second distances of all the curves is:

$$MovedPower = [0, MovedPower_2, \ldots, MovedPower_i, \ldots, MovedPower_n] \quad (4)$$

According to formula (4), the translation in step 202 can be completed, to obtain the transmission characteristic curve of the to-be-measured frequency band.

If there are two to-be-measured channels, only a transmission characteristic curve of a following channel needs to be shifted, that is, only one first distance MovedV needs to be calculated. Therefore, a summation of all first distances MovedV does not need to be calculated. Only a transmission characteristic curve of a previous channel needs to be fixed, and the transmission characteristic curve of the following channel is translated in an amplitude direction by the first distance MovedV. Consequently, frequency-overlapped parts of the transmission characteristic curves of the two channels can be overlapped.

Step 203: Set the continuous curve as a transmission characteristic curve of the contiguous frequency band.

Figure 5:
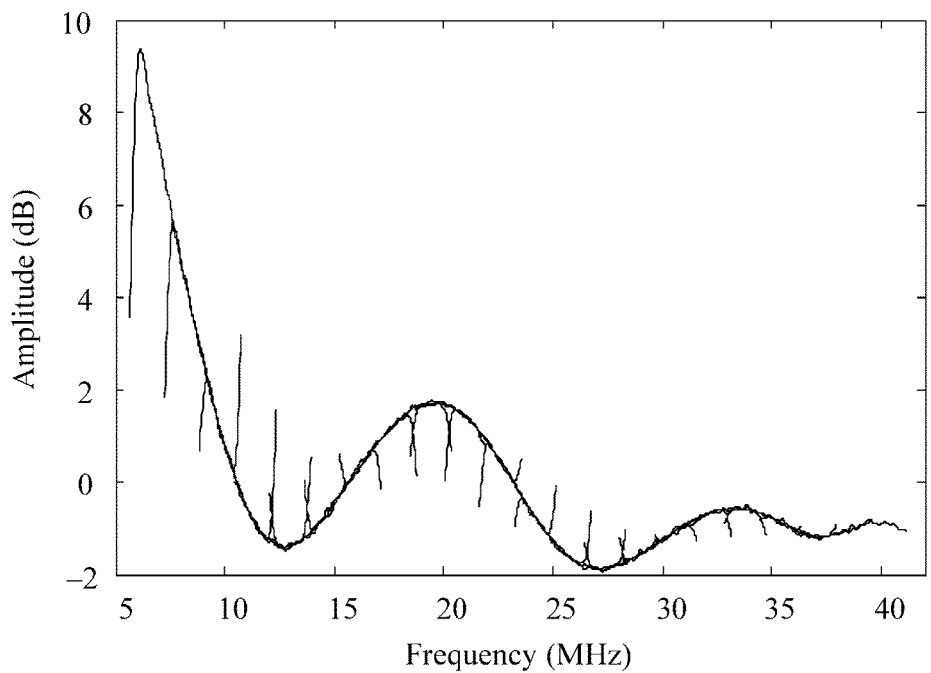
FIG. 5 is a transmission characteristic curve obtained by means of translation and of an entire to-be-measured frequency band.

Similarly, the transmission characteristic curves of the multiple channels in the CM shown in FIG. 4 are used as an example. A continuous curve obtained according to the translation in step 202 is shown in FIG. 5. FIG. 5 is a transmission characteristic curve obtained by means of translation and of an entire to-be-measured frequency band.

It should be noted that the obtained transmission characteristic curve of the to-be-measured frequency band in this case is a relative value of a transmission characteristic, not an absolute value. That is, a location corresponding to each frequency on the curve can reflect a transmission characteristic of a channel. According to a shape of the curve, quality of the channel can be analyzed, and fault diagnosis and locating, line adjustment, and the like can be performed. However, an amplitude of the curve is not an actual receive level. To obtain an absolute value of the transmission characteristic of the to-be-measured frequency band, the following optional steps 204 to 206 need to be executed.

Step 204 (optional): Collect transmit power and receive power corresponding to each of the channels.

For an uplink channel, in step 204, transmit power of the CM and receive power of a CMTS corresponding to each of the channels are collected. For a downlink channel, in step 204, transmit power of the CMTS and receive power of the CM corresponding to each of the channels are collected.

Step 205 (optional): Obtain line attenuation power according to the transmit power and the receive power corresponding to each of the channels.

Step 206 (optional): Shift upward the transmission characteristic curve of the frequency band in an amplitude direction by a value of the line attenuation power, to obtain an absolute value of a transmission characteristic of the frequency band.

Figure 6:
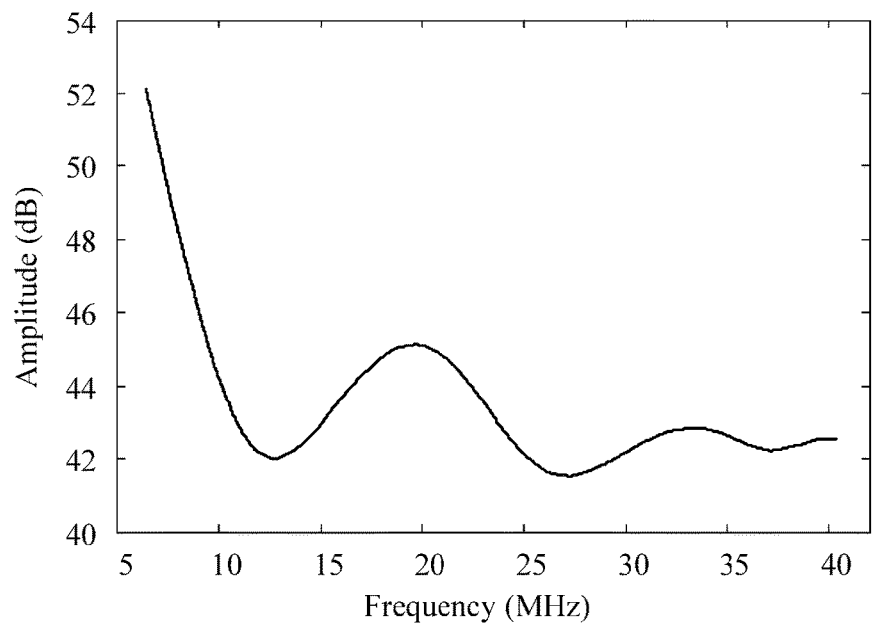
FIG. 6 is a channel transmission characteristic absolute value curve corresponding to the channel transmission characteristic curve shown in FIG. 5.

A channel transmission characteristic curve shown in FIG. 5 is used as an example for description. If calculated line attenuation power is 44 decibel (dB), the channel transmission characteristic curve shown in FIG. 5 may be translated upward by 44 dB, to obtain a curve shown in FIG. 6. FIG. 6 is a channel transmission characteristic absolute value curve corresponding to the channel transmission characteristic curve shown in FIG. 5.

According to this embodiment of the present disclosure, a transmission characteristic curve of each channel on a to-be-measured frequency band in a CM is obtained, and a transmission characteristic curve of the entire to-be-measured frequency band is obtained in a curve translation manner. Because a data collection process and a data processing process can be performed when an HFC network is in a working state, the transmission characteristic curve of the to-be-measured frequency band can be obtained when the HFC network is in a working state. In addition, a manner of collecting a pre-equalization coefficient of a channel or directly collecting in-band frequency response data of a channel is used instead of a manner of measuring a signal using an external instrument, and there is no impact caused by noise during instrument measurement. Therefore, compared with a transmission characteristic curve that is obtained using a spectrum analyzer or a network analyzer in the prior art, the transmission characteristic curve obtained according to the method in this embodiment of the present disclosure has higher accuracy.

Figure 7:
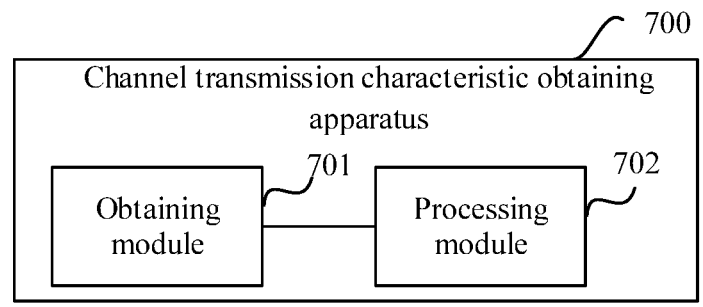
FIG. 7 is a schematic structural diagram of a channel transmission characteristic obtaining apparatus according to an embodiment of the present disclosure.

FIG. 7 is a schematic structural diagram of a channel transmission characteristic obtaining apparatus 700 according to an embodiment of the present disclosure. As shown in FIG. 7, the channel transmission characteristic obtaining apparatus 700 in this embodiment may include an obtaining module 701 and a processing module 702.

The obtaining module 701 may be configured to obtain transmission characteristic curves of at least two channels in a CM in a channel scanning manner, where one characteristic curve reflects amplitudes of one channel at all frequencies, the at least two channels form one contiguous frequency band, and frequencies corresponding to the transmission characteristic curves of the at least two channels have frequency values on a same order of magnitude, and have amplitude values on a same order of magnitude.

The processing module 702 may be configured to translate the transmission characteristic curves of the channels in an amplitude direction, to make amplitudes corresponding to same frequencies on all transmission characteristic curves overlapped in order to form one continuous curve, and set the continuous curve as a transmission characteristic curve of the contiguous frequency band.

The channel transmission characteristic obtaining apparatus 700 in this embodiment may be configured to execute the technical solutions in FIG. 2 and the foregoing method embodiment. Implementation principles of the channel transmission characteristic obtaining apparatus 700 and the method embodiment are similar. Functions of each function module of the channel transmission characteristic obtaining apparatus 700 may be further implemented according to the method in the foregoing method embodiment. For a specific implementation process thereof, refer to related description in the foregoing embodiment, and details are not described herein.

According to the channel transmission characteristic obtaining apparatus 700 in this embodiment, the obtaining module 701 obtains a transmission characteristic curve of each channel on a to-be-measured frequency band in a CM, and the processing module 702 obtains a transmission characteristic curve of the entire to-be-measured frequency band in a curve translation manner. Because a data collection process and a data processing process can be performed when an HFC network is in a working state, the transmission characteristic curve of the to-be-measured frequency band can be obtained when the HFC network is in a working state. In addition, a manner of collecting a pre-equalization coefficient of a channel or directly collecting in-band frequency response data of a channel is used instead of a manner of measuring a signal using an external instrument, and there is no impact caused by noise during instrument measurement. Therefore, compared with a transmission characteristic curve obtained using a spectrum analyzer or a network analyzer, the transmission characteristic curve obtained in this embodiment of the present disclosure has higher accuracy.

Optionally, the processing module 702 in the channel transmission characteristic obtaining apparatus 700 in the foregoing embodiment may be further configured to calculate a difference between amplitudes corresponding to a same frequency on transmission characteristic curves of any two adjacent channels, and set the difference as a first distance MovedV, fix a transmission characteristic curve of one channel in the any two adjacent channels, and translate a transmission characteristic curve of the other channel in an amplitude direction by the first distance MovedV, to make the amplitudes corresponding to the same frequency on the transmission characteristic curves of the two adjacent channels overlapped in order to form a transmission characteristic curve corresponding to a frequency band including the two adjacent channels, and continue to execute the foregoing steps for the transmission characteristic curve corresponding to the frequency band including the adjacent channels, until transmission characteristic curves corresponding to all channels form one continuous curve.

For ease of implementation, the processing module 702 may be further configured to fix a transmission characteristic curve of a channel that has a smaller frequency in the any two adjacent channels, and translate a transmission characteristic curve of the other channel.

Further, the processing module 702 in the channel transmission characteristic obtaining apparatus 700 in the foregoing embodiment may be further configured to calculate a difference between amplitudes corresponding to a same frequencies on transmission characteristic curves of any two adjacent channels, and set the difference as a first distance MovedV, fix a transmission characteristic curve of one channel in the any two adjacent channels, and translate a transmission characteristic curve of the other channel in an amplitude direction by the first distance MovedV, to make the amplitudes corresponding to the same frequencies on the transmission characteristic curves of the two adjacent channels overlapped, and repeatedly execute the foregoing steps, until transmission characteristic curves corresponding to all channels form one continuous curve.

Optionally, if there are N channels, where N is an integer greater than 1, a channel that has a minimum central frequency is a first channel, and other channels are sorted in ascending order of frequency values of central frequencies, the processing module 702 in the channel transmission characteristic obtaining apparatus 700 in the foregoing embodiment may be further configured to calculate a difference between amplitudes corresponding to a same frequency on transmission characteristic curves of any two adjacent channels, and set the difference as a first distance MovedV, where a first distance corresponding to a transmission characteristic curve of a $j^{th}$ channel is $MovedV_j$, and j is an integer greater than 1 and less than or equal to N, calculate a second distance corresponding to a transmission characteristic curve of an $i^{th}$ channel according to the following formula:

$$MovedPower_i = \sum_{j=2}^{i} MovedV_j,$$

where $MovedPower_i$ is the second distance corresponding to the transmission characteristic curve of the $i^{th}$ channel, and i is an integer greater than 1 and less than or equal to N, fix a transmission characteristic curve of the first channel, and separately translate transmission characteristic curves of the other channels in an amplitude direction by second distances corresponding to the transmission characteristic curves of the channels, to make amplitudes corresponding to same frequencies on the transmission characteristic curves of all the channels overlapped in order to form one continuous curve.

Further, if there are multiple same frequencies on the transmission characteristic curves of the at least two channels, the processing module 702 is further configured to calculate differences between amplitudes corresponding to all the same frequencies on the transmission characteristic curves of the adjacent channels, calculate an average value of the differences between the amplitudes corresponding to all the same frequencies, and set the average value as the first distance MovedV.

Further, if an in-band frequency response of a channel cannot be directly collected in a network, the obtaining module 701 may be further configured to collect pre-equalization coefficients of the at least two channels in the CM, and obtain the transmission characteristic curves of the channels according to the pre-equalization coefficients of the at least two channels.

It should be noted that the obtained transmission characteristic curve of the to-be-measured frequency band in this case is a relative value of a transmission characteristic, not an absolute value. That is, a location corresponding to each frequency on the curve can reflect a transmission characteristic of a channel. According to a shape of the curve, quality of the channel can be analyzed, and fault diagnosis and locating, line adjustment, and the like can be performed. However, an amplitude of the curve is not an actual receive level. To obtain an absolute value of the transmission characteristic of the to-be-measured frequency band, optionally, the obtaining module 701 may be further configured to collect transmit power of the CM and receive power of a CMTScorresponding to each of the channels.

The processing module 702 may be further configured to obtain line attenuation power according to the transmit power and the receive power corresponding to each of the channels, and shift upward the transmission characteristic curve of the frequency band in an amplitude direction by a value of the line attenuation power, to obtain the absolute value of the transmission characteristic of the frequency band.

Figure 8:
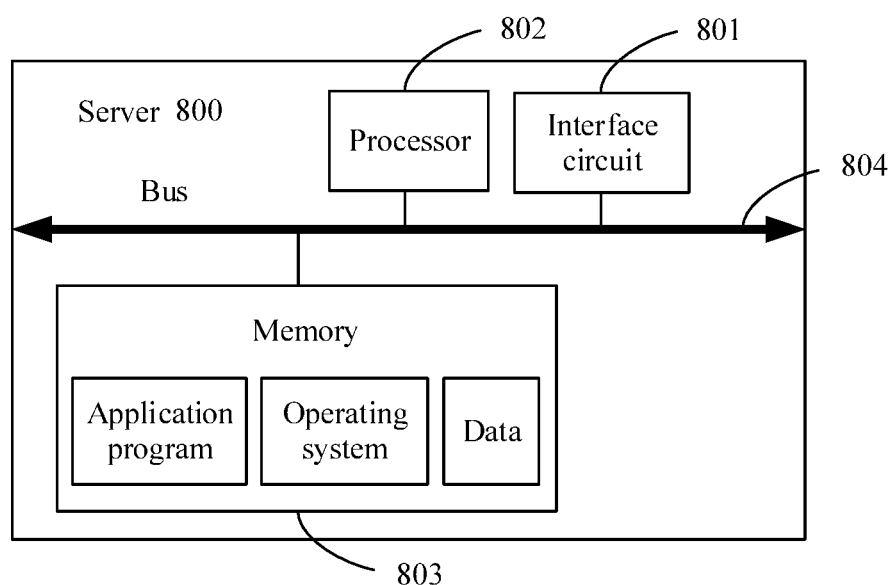
FIG. 8 is a schematic structural diagram of a server that can be used for obtaining a channel transmission characteristic according to an embodiment of the present disclosure.

FIG. 8 is a schematic structural diagram of a server 800 that can be used for obtaining a channel transmission characteristic according to an embodiment of the present disclosure. As shown in FIG. 8, the server 800 includes an interface circuit 801 and a processor 802. A memory 803 and a bus 804 are also shown in the figure. The processor 802, the interface circuit 801, and the memory 803 are connected using the bus 804 to perform mutual communication.

The bus 804 may be an Industry Standard Architecture (ISA) bus, a Peripheral Component Interconnect (PCI) bus, an Extended Industry Standard Architecture (EISA) bus, or the like. The bus 804 may be classified into an address bus, a data bus, a control bus, and the like. For ease of representation, only one bold line is used in FIG. 8 for representation, but it does not indicate that there is only one bus or one type of bus.

The memory 803 is configured to store executable program code, and the program code includes a computer operation instruction. The memory 803 may include a high-speed random access memory (RAM), and may further include a non-volatile memory, such as at least one disk memory.

The processor 802 may be a central processing unit (CPU), or may be an application-specific integrated circuit (ASIC), or may be configured as one or more integrated circuits that implement this embodiment of the present disclosure.

The interface circuit 801 is configured to obtain transmission characteristic curves of at least two channels in a CM in a channel scanning manner, where one characteristic curve reflects amplitudes of one channel at all frequencies, the at least two channels form one contiguous frequency band, and frequencies corresponding to the transmission characteristic curves of the at least two channels have frequency values on a same order of magnitude, and have amplitude values on a same order of magnitude.

The processor 802 is configured to translate the transmission characteristic curves of the channels in an amplitude direction, to make amplitudes corresponding to same frequencies on all the transmission characteristic curves overlapped in order to form one continuous curve, and set the continuous curve as a transmission characteristic curve of the frequency band.

Optionally, the processor 802 is further configured to calculate a difference between amplitudes corresponding to a same frequencies on transmission characteristic curves of any two adjacent channels, set the difference as a first distance MovedV, fix a transmission characteristic curve of one channel in the any two adjacent channels, translate a transmission characteristic curve of the other channel in an amplitude direction by the first distance MovedV, to make the amplitudes corresponding to the same frequencies on the transmission characteristic curves of the two adjacent channels overlapped in order to form a transmission characteristic curve corresponding to a frequency band including the two adjacent channels, and continue to execute the foregoing steps for the transmission characteristic curve corresponding to the frequency band including the adjacent channels, until transmission characteristic curves corresponding to all channels form one continuous curve.

For ease of implementation, the processor 802 may be further configured to fix a transmission characteristic curve of a channel that has a smaller frequency in the any two adjacent channels.

In an optional embodiment, there are N channels, and N is an integer greater than 1. A channel that has a central frequency whose frequency value is minimum is a first channel, and other channels are sorted in ascending order of frequency values of central frequencies. The processor 802 is further configured to calculate a difference between amplitudes corresponding to a same frequency on transmission characteristic curves of any two adjacent channels, set the difference as a first distance MovedV, where a first distance corresponding to a transmission characteristic curve of a $j^{th}$ channel is $MovedV_j$, and j is an integer greater than 1 and less than or equal to N, calculate a second distance corresponding to a transmission characteristic curve of an $i^{th}$ channel according to the following formula $$MovedPower_i = \sum_{j=2}^{i} MovedV_j,$$

where $MovedPower_i$ is the second distance corresponding to the transmission characteristic curve of the $i^{th}$ channel, and i is an integer greater than 1 and less than or equal to N, fix a transmission characteristic curve of the first channel, and separately translate transmission characteristic curves of the other channels in an amplitude direction by second distances corresponding to the transmission characteristic curves of the channels, to make amplitudes corresponding to same frequencies on the transmission characteristic curves of the two adjacent channels overlapped in order to form one continuous curve.

In specific implementation, if there are multiple same frequencies on the transmission characteristic curves of the at least two channels, the processor 802 is further configured to calculate differences between amplitudes corresponding to all the same frequencies on the transmission characteristic curves of the adjacent channels, calculate an average value of the differences between the amplitudes corresponding to all the same frequencies, and set the average value as the first distance MovedV.

Optionally, if a transmission characteristic curve of a channel cannot be directly collected in a network, the interface circuit 801 is further configured to collect pre-equalization coefficients of the at least two channels in the CM, and obtain the transmission characteristic curves of the channels according to the pre-equalization coefficients of the at least two channels.

It should be noted that the obtained transmission characteristic curve of the to-be-measured frequency band in this case is a relative value of a transmission characteristic, not an absolute value. That is, a location corresponding to each frequency on the curve can reflect a transmission characteristic of a channel. According to a shape of the curve, quality of the channel can be analyzed, and fault diagnosis and locating, line adjustment, and the like can be performed. However, an amplitude of the curve is not an actual receive level. To obtain an absolute value of the transmission characteristic of the to-be-measured frequency band, optionally, the interface circuit 801 may be further configured to collect transmit power of the CM and receive power of a CMTS that are corresponding to each of the channels.

The processor 802 may be further configured to obtain line attenuation power according to the transmit power and the receive power corresponding to each of the channels, and shift upward the transmission characteristic curve of the frequency band in an amplitude direction by a value of the line attenuation power, to obtain the absolute value of the transmission characteristic of the frequency band.

The server 800 in this embodiment may be configured to execute the technical solutions in FIG. 2 and the foregoing method embodiment. Implementation principles of the server 800 and the method embodiment are similar. Functions of each function module of the server 800 may be further implemented according to the method in the foregoing method embodiment. For a specific implementation process thereof, refer to related description in the foregoing embodiment, and details are not described herein.

According to the server 800 in this embodiment, an interface circuit 801 obtains a transmission characteristic curve of each channel on a to-be-measured frequency band in a CM, and a processor 802 obtains a transmission characteristic curve of the entire to-be-measured frequency band in a curve translation manner. Because a data collection process and a data processing process can be performed when an HFC network is in a working state, the transmission characteristic curve of the to-be-measured frequency band can be obtained when the HFC network is in a working state. In addition, a manner of collecting a pre-equalization coefficient of a channel or directly collecting in-band frequency response data of a channel is used instead of a manner of measuring a signal using an external instrument, and there is no impact caused by noise during instrument measurement. Therefore, compared with a transmission characteristic curve obtained using a spectrum analyzer or a network analyzer, the transmission characteristic curve obtained in this embodiment of the present disclosure has higher accuracy.

Persons of ordinary skill in the art may understand that all or some of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A channel transmission characteristic obtaining method, comprising:
    obtaining a plurality of transmission characteristic curves of a plurality of channels in a cable modem in a channel scanning manner, one transmission characteristic curve reflecting amplitudes of one channel at all frequencies, the channels forming one contiguous frequency band, and frequencies corresponding to the transmission characteristic curves of the channels comprising frequency values on a same order of magnitude and amplitude values on a same order of magnitude;
    translating the transmission characteristic curves of the channels in an amplitude direction to make amplitudes corresponding to same frequencies on all transmission characteristic curves overlapped to form one continuous curve; and
    setting the continuous curve as a transmission characteristic curve of the contiguous frequency band.

2. The method of claim 1, wherein translating the transmission characteristic curves of the channels to form one continuous curve comprises:
    calculating a difference between amplitudes corresponding to a same frequency on transmission characteristic curves of two adjacent channels;
    setting the difference as a first distance MovedV;
    fixing a transmission characteristic curve of one of the adjacent channels; and
    translating a transmission characteristic curve of the other of the adjacent channels in the amplitude direction by the first distance MovedV to make the amplitudes corresponding to the same frequency on the transmission characteristic curves of the adjacent channels overlapped to form a transmission characteristic curve corresponding to a frequency band comprising the adjacent channels.

3. The method of claim 2, wherein fixing the transmission characteristic curve of one of the adjacent channels comprises fixing a transmission characteristic curve of a channel comprising a smaller frequency in the adjacent channels.

4. The method of claim 2, wherein there is a plurality of same frequencies on the transmission characteristic curves of the adjacent channels, and calculating the difference between amplitudes corresponding to the same frequency on the transmission characteristic curves of the adjacent channels, and setting the difference as the first distance MovedV comprises:
    calculating a plurality of differences between amplitudes corresponding to the same frequencies on the transmission characteristic curves of the adjacent channels;
    calculating an average value of the differences between the amplitudes corresponding to the same frequencies; and
    setting the average value as the first distance MovedV.

5. The method of claim 1, wherein obtaining the transmission characteristic curves of the channels in the cable modem comprises:
    collecting pre-equalization coefficients of the channels in the cable modem; and
    obtaining the transmission characteristic curves of the channels according to the pre-equalization coefficients of the channels.

6. The method of claim 1, further comprising:
    collecting transmit power of the cable modem and receive power of a cable modem termination system corresponding to each of the channels;
    obtaining line attenuation power according to the transmit power and the receive power corresponding to each of the channels; and
    shifting upward the transmission characteristic curve of the contiguous frequency band in the amplitude direction by a value of the line attenuation power to obtain an absolute value of a transmission characteristic of the contiguous frequency band.

7. A channel transmission characteristic obtaining apparatus, comprising:
    a receiver configured to obtain a plurality of transmission characteristic curves of a plurality of channels in a cable modem in a channel scanning manner, one transmission characteristic curve reflecting amplitudes of one channel at all frequencies, the channels forming one contiguous frequency band, and frequencies corresponding to the transmission characteristic curves of the channels comprising frequency values on a same order of magnitude and amplitude values on a same order of magnitude; and
    a processor coupled to the receiver and configured to:
        translate the transmission characteristic curves of the channels in an amplitude direction to make amplitudes corresponding to same frequencies on all transmission characteristic curves overlapped in order to form one continuous curve; and
        set the continuous curve as a transmission characteristic curve of the contiguous frequency band.

8. The apparatus of claim 7, wherein the processor is further configured to:
    calculate a difference between amplitudes corresponding to a same frequency on transmission characteristic curves of two adjacent channels;
    set the difference as a first distance MovedV;
    fix a transmission characteristic curve of one of the adjacent channels; and
    translate a transmission characteristic curve of the other of the adjacent channels in the amplitude direction by the first distance MovedV to make the amplitudes corresponding to the same frequency on the transmission characteristic curves of the adjacent channels overlapped to form a transmission characteristic curve corresponding to a frequency band comprising the adjacent channels.

9. The apparatus of claim 8, wherein the processor is further configured to fix a transmission characteristic curve of a channel comprising a smaller frequency in the adjacent channels.

10. The apparatus of claim 8, wherein there is a plurality of same frequencies on the transmission characteristic curves of the adjacent channels, and the processor is further configured to:
    calculate a plurality of differences between amplitudes corresponding to the same frequencies on the transmission characteristic curves of the adjacent channels;
    calculate an average value of the differences between the amplitudes corresponding to the same frequencies; and
    set the average value as the first distance MovedV.

11. The apparatus of claim 7, wherein the receiver is further configured to:
    collect pre-equalization coefficients of the channels in the cable modem; and obtain the transmission characteristic curves of the channels according to the pre-equalization coefficients of the channels.

12. The apparatus of claim 7, wherein the receiver is further configured to collect transmit power of the cable modem and receive power of a cable modem termination system corresponding to each of the channels, and the processor is further configured to:
obtain line attenuation power according to the transmit power and the receive power corresponding to each of the channels; and
shift upward the transmission characteristic curve of the contiguous frequency band in the amplitude direction by a value of the line attenuation power, to obtain an absolute value of a transmission characteristic of the contiguous frequency band.

13. A server, comprising:
an interface circuit configured to obtain a plurality of transmission characteristic curves of a plurality of channels in a cable modem in a channel scanning manner, one transmission characteristic curve reflecting amplitudes of one channel at all frequencies, the channels forming one contiguous frequency band, and frequencies corresponding to the transmission characteristic curves of the channels comprising frequency values on a same order of magnitude and amplitude values on a same order of magnitude; and
a processor coupled to the interface circuit and configured to:
translate the transmission characteristic curves of the channels in an amplitude direction to make amplitudes corresponding to same frequencies on all transmission characteristic curves overlapped to form one continuous curve; and
set the continuous curve as a transmission characteristic curve of the contiguous frequency band.

14. The server of claim 13, wherein the processor is further configured to:
calculate a difference between amplitudes corresponding to a same frequency on transmission characteristic curves of two adjacent channels;
set the difference as a first distance MovedV;
fix a transmission characteristic curve of one of the adjacent channels; and
translate a transmission characteristic curve of the other of the adjacent channels in the amplitude direction by the first distance MovedV to make the amplitudes corresponding to the same frequency on the transmission characteristic curves of the adjacent channels overlapped to form a transmission characteristic curve corresponding to a frequency band comprising the adjacent channels.

15. The server of claim 14, wherein there is a plurality of same frequencies on the transmission characteristic curves of the adjacent channels, and the processor is further configured to:
calculate a plurality of differences between amplitudes corresponding to the same frequencies on the transmission characteristic curves of the adjacent channels;
calculate an average value of the differences between the amplitudes corresponding to the same frequencies; and
set the average value as the first distance MovedV.

16. The server of claim 13, wherein the processor being configured to obtain the transmission characteristic curves of the channels in the cable modem comprises the processor being configured to:
collect pre-equalization coefficients of the channels in the cable modem; and
obtain the transmission characteristic curves of the channels according to the pre-equalization coefficients of the channels.

17. The server of claim 13, wherein the processor is further configured to:
collect transmit power of the cable modem and receive power of a cable modem termination system corresponding to each of the channels;
obtain line attenuation power according to the transmit power and the receive power corresponding to each of the channels; and
shift upward the transmission characteristic curve of the contiguous frequency band in the amplitude direction by a value of the line attenuation power to obtain an absolute value of a transmission characteristic of the contiguous frequency band.

18. The server of claim 14, wherein fixing the transmission characteristic curve of one of the adjacent channels comprises fixing a transmission characteristic curve of a channel comprising a smaller frequency in the adjacent channels.

19. The server of claim 14, wherein the transmission characteristic curves corresponding to all channels form the one continuous curve.

20. The apparatus of claim 8, wherein the transmission characteristic curves corresponding to all channels form the one continuous curve.

* * * * *